Jan. 16, 1962  W. B. ATKINS  3,016,586
CONNECTOR PLATE
Filed Oct. 6, 1959
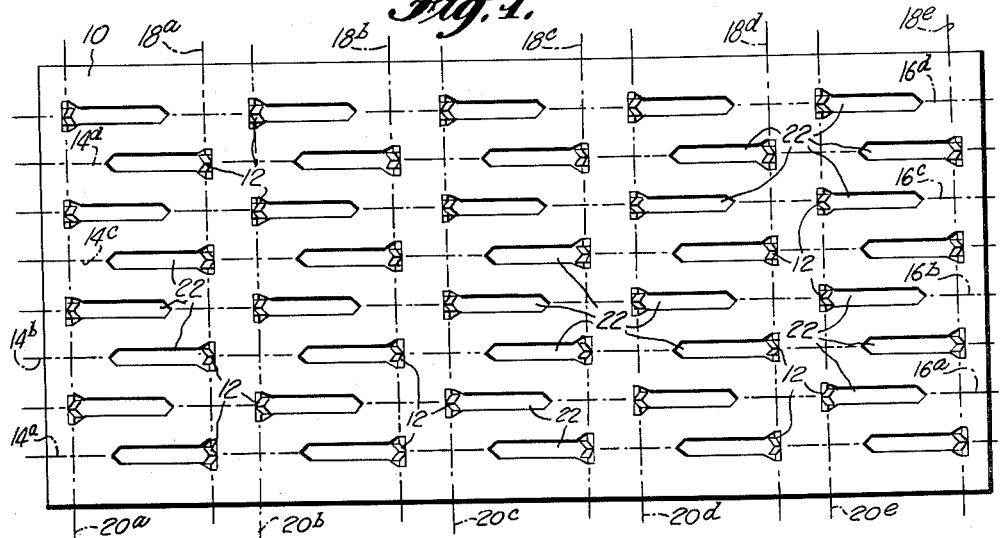
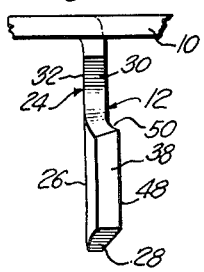 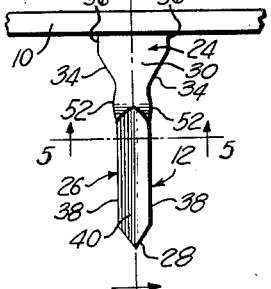 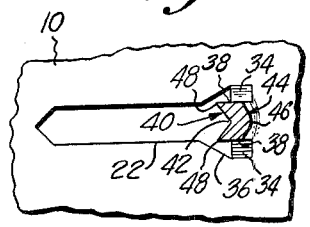
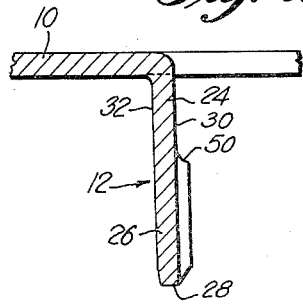
INVENTOR
Wyman B. Atkins
BY Mason, Fenwick & Lawrence
ATTORNEYS

United States Patent Office 3,016,586
Patented Jan. 16, 1962

3,016,586
CONNECTOR PLATE
Wyman B. Atkins, North Miami, Fla., assignor to Timber Truss Connectors, Inc., a corporation of Florida
Filed Oct. 6, 1959, Ser. No. 844,724
5 Claims. (Cl. 20—92)

The present invention relates in general to connector plates for wooden structural members, and particularly to metal connector plates having a plurality of unidirectionally projecting integral teeth to be pressed into timbers at opposite sides of adjoining timber members to provide strong timber joints.

Heretofore, a number of different types of metal connector plates having integral punched-out teeth extending substantially perpendicular to the plane of the connector plate have been developed for providing mechanical connections between adjoining wooden structural members lying in the same plane. An advantage of these connector plates is that they permit the rapid forming of timber joints and prefabricated wooden structural units such as timber trusses and the like by the expedient of impressing a single connector plate having many teeth into the adjacent portions of the timber members to be joined at opposite sides of the timber joint, thus drastically reducing the time and labor involved in assembling such wooden structural units by means of metal plates and a plurality of nails or through bolts as was the former practice. The teeth of the connector plates heretofore available have generally been in the form of triangular shaped teeth punched out of a sheet metal plate and extending integrally at right angles from the plate in a single direction, the teeth having parallel front and back faces and inclined side edges converging outwardly from the plate to a sharp apex spaced from the plate, or long slender nail-like teeth which have parallel front and rear faces and parallel sides throughout their length. While these connector plates have distinct advantage over the apertured connector plates secured by nails or through bolts to the timber members in accordance with the former practice, improvement in the construction and properties of these connector plates is desired.

An object of the present invention is the provision of an integral connector plate for joining adjacent timber members together, having a plurality of integral punched-out teeth extending at right angles in a single direction from the connector plate to be impressed into the timber members, which will provide a strong connection, adequately resisting forces of tension and compresssion.

Another object of the present invention is the provision of a novel connector plate for wooden structural members having a plurality of integral punched out teeth to be impressed into the wooden members, wherein the teeth of the connector plate have greater strength and minimize splitting or weakening of the wooden members when applied adjacent the butt ends of the wooden members.

Another object of the present invention is the provision of a novel metal connector plate for timber members having a plurality of integral punched-out teeth to be impressed into the timber members, wherein the teeth are of such a configuration and structure that very little pressure is required to imbed the teeth into the timber members.

Another object of the present invention is the provision of a novel metal connector plate for timber members having a plurality of integral punched-out teeth to be impressed into the timber members, wherein the configuration and structure of the teeth is such as to resist accidental withdrawal or working out of the teeth from the timber members.

Other objects, advantages and capabilities of the present invention will become apparent from the following detailed description, taken in conjunction with the accompanying drawing illustrating one preferred embodiment of the invention.

In the drawing:
FIGURE 1 is a bottom plan view of a connector plate constructed in accordance with the present invention;
FIGURE 2 is a side elevation of the connector plate;
FIGURE 3 is an enlarged fragmentary side elevation of the connector plate showing one of the struck out teeth thereof;
FIGURE 4 is a fragmentary end elevation of the connector plate showing one of the struck out teeth thereof;
FIGURE 5 is a horizontal section view of one of the struck out teeth taken along the line 5—5 of FIGURE 4; and
FIGURE 6 is a vertical section view through one of the struck out teeth taken along the line 6—6 of FIGURE 4.

Referring to the drawing, wherein like reference characters designate corresponding parts throughout the several figures, the connector plate of the present invention comprises a rectangular metal plate 10 having a plurality of teeth 12 punched unidirectionally from the plate to extend substantially perpendicular to the plane of the plate 10. In one particular embodiment of the invention, the plate is a 14 gage galvanized steel plate approximtaely 7½ inches long and 3⅜ inches wide having 40 teeth 12 projecting therefrom, this particular example being adapted for joining conventional two-by-four timbers. The teeth 12 are arranged in a plurality of longitudinal rows arranged parallel to the longitudinal axis of the plate 10 and spaced uniform distances apart, the teeth in alternate longitudinal rows facing in opposite directions. In the embodiment illustrated in the drawing, the teeth 12 are arranged in eight longitudinal rows, the broken longitudinal lines identified by the reference characters 14a, 14b, 14c, and 14d designating the rows of teeth 12 facing to the left as viewed in FIGURES 1 and 2 and the broken lines identified by the reference characters 16a, 16b, 16c and 16d designating the rows of teeth 12 facing to the right. The teeth 12 are also arranged in transverse rows extending parallel to the ends of the plate 10, the teeth 12 of the longitudinal rows 14a–14d in the preferred embodiment illustrated being aligned along transverse rows designated by the broken lines 18a to 18e, and the teeth 12 in the longitudinal rows 16a–16d being aligned along transverse rows designated by the broken lines 20a to 20e.

The successive transverse rows of teeth 12 are not spaced equally longitudinally from each other in the preferred embodiment, the rows 18a–18d of teeth 12 being disposed closer to the rows 20b–20e, respectively, than to the rows 20a–20d respectively.

In a preferred example, the successive teeth 12 of each individual longitudinal row may be spaced 1½ inches apart longitudinally of the plate 10 and may be ¾ inch long, the centers of the successive longitudinal rows of teeth may be spaced ⅜ inch apart transversely of the plate 10, and the rows 18a to 18d may be spaced ⅜ inch longitudinally of the plate 10 from the transverse rows 20b to 20e, respectively. Since the punching of the teeth 12 from the plate 10 to assume the perpendicular position relative to the plate illustrated in FIGURE 2 leaves an elongated opening 22 in the plate 10 for each tooth corresponding to the length of the tooth, it will be apparent that the rows 18a to 18d of the teeth 12 facing to the left as viewed in FIGURE 1 will occupy positions substantially midway between the rows 20b–20e, respectively, and the adjacent ends of the openings 22 for the teeth of the rows 20a–20d, respectively.

The specific form and configuration of the teeth 12 will be more apparent from an inspection of the enlarged FIGURES 3 through 6 of the drawing. The teeth 12 are all of substantially identical configuration so that a detailed description of one of the teeth 12 will suffice for a clear understanding of the invention. Each tooth 12 is formed from a basic blank shape having a configuration revealed by the cut-out opening 22 left in the plate 10 after the tooth is struck therefrom, shown most clearly in FIGURE 5, and comprises a shallow base portion 24, an elongated shank portion 26 and a tip or point 28 of triangular profile. The proximal end of the base portion 24 adjoining the plate 10 is appreciably wider than is the shank portion 26, the base portion having a flat parallel front and back faces 30 and 32 and a substantially trapezoidal front profile including outwardly converging inclined sides 34 joining the shank portion 26 at the distal end of the base portion 24 and having very short parallel extensions 36 immediately adjacent the proximal end of the base portion. The shank portion 26 has parallel sides 38 and is dished or crimped about its longitudinal medial axis to assume a substantially V-shaped cross section as illustrated in FIGURE 5, the front surface 40 of the shank portion 26 being thereby deformed to provide a valley or trough 42 extending substantially along the entire length of the shank portion and the rear face 44 of the shank portion being thereby convexly curved about a medial ridge 46. The apex of the concave valley 42 extends from a point closely adjacent the proximal end of the shank portion 26 uninterruptedly to the apex of the tip 28. The nature of the forming die for producing the V-shaped sectional character of the shank portion 26 is dimensioned so as to squeeze the sides of the shank portion slightly toward each other as the shank portion is being crimped into the V-shaped section so as to provide considerably wider sides 38 in the shank region than the width of the sides 34 of the base portion and form very sharp wedge shaped projections 48 laterally bounding the valley 42 and extending forwardly of the tooth a considerable distance beyond the front face 30 of the base portion substantially along the entire length of the shank and terminating at the proximal end in shoulder 50. The squeezing of the shank sides 38 towards each other and the dishing of the shank to provide the V-shaped section also distorts the shank portion immediately adjacent the base portion 24 to provide laterally outwardly flaring crests 52 which further resist withdrawal of the teeth from the timbers into which they have been impressed.

It will be apparent that the effect of this crimping or dishing of the shank portion 26 of the tooth 12 will be to rigidify and strengthen the tooth 12. The particular configuration of the tooth will provide a more effective cutting action to facilitate penetration of the wood into which the teeth are to be impressed. Additionally, shoulders 50 at the proximal ends of the wedge-shaped projection 48 which extend beyond the flat front face 30 will increase resistance to pulling out of the teeth from the timbers as the wood which is forced aside during insertion of the tooth will tend to close in beneath the shoulders 50, and the V-shaped section of the teeth will give the teeth much greater holding power and minimize splitting of the timbers.

While but one preferred embodiment of the present invention has been specifically shown and described, it is apparent that various modifications may be made therein within the spirit and scope of the invention and it is desired, therefore, that only such limitations be placed thereon as are imposed by the prior art and set forth in the appended claims.

What is claimed is:

1. A connector plate for securing adjacent wooden structural members together comprising a metal plate having substantially parallel planar inner and outer faces, a series of elongated teeth integral with said plate punched therefrom and extending unidirectionally substantially perpendicularly from said plate to be impressed into the wooden members, said teeth terminating in a sharpened tip remote from said plate and having front and back faces formed from the outer and inner faces of said plate respectively, each tooth having a crimped zone curved concavely in section toward its vacated hole in said plate extending from a point spaced from said plate continuously to said sharpened tip along a major portion of the tooth, said crimped zone having substantially parallel sides, the lateral marginal portions of the front face and the adjoining portions of said sides forming elongated wedge-shaped formations projecting forwardly of the tooth portion connecting said zone with said plate which terminate in shoulders projecting forwardly from said connecting tooth portion to resist withdrawal of the teeth from the wooden members into which they are impressed.

2. A connector plate for securing adjacent wooden structural members together comprising a metal plate having substantially parallel planar inner and outer faces, a series of elongated teeth integral with said plate punched therefrom and extending unidirectionally substantially perpendicularly from said plate to be impressed into the wooden members, said teeth having a base portion immediately adjacent said plate, a sharpened tip remote from said plate, and an intervening elongated shank portion, said base portion having parallel front and back faces, said shank portion being concavely curved in section toward its vacated hole along the medial longitudinal axis of the tooth to provide a valley extending substantially along the entire length of the shank portion and the sides of the tooth along the shank portion being substantially parallel and being squeezed toward each other to form the lateral marginal portions of the shank portion into sharp wedge-shaped projections flanking the apex of the valley and extending forwardly of the front face of the base portion which terminate at their proximal ends in shoulders returning to the plane of said front face of the base portion and spaced from said plate to restrain withdrawal of the teeth from wooden members into which they have been impressed.

3. A connector plate for securing adjacent wooden structural members together comprising a metal plate having substantially parallel planar inner and outer faces, a series of elongated teeth integral with said plate punched therefrom and extending unidirectionally substantially perpendicularly from said plate to be impressed into the wood members, said teeth having a base portion immediately adjacent said plate, a sharpened tip remote from said plate, and an intervening elongated shank portion comprising the major portion of the length of said teeth, said base portion having parallel front and back faces and being substantially trapezoidal in front elevation with the sides thereof converging away from said plate, said shank portion being concavely curved in section toward its vacated hole along the medial longitudinal axis of the tooth to provide a valley extending substantially along the entire length of the shank portion and the sides of the tooth along the shank portion being substantially parallel and being squeezed toward each other to form the lateral marginal portions of the shank portion into sharp wedge-shaped projections flanking the apex of the valley and extending forwardly of the front face of the base portion which terminate at their proximal ends in shoulders returning to the plane of said front face of the base portion and spaced from said plate to restrain withdrawal of the teeth from wooden members into which they have been impressed.

4. A connector plate for securing adjacent wooden structural members together comprising an elongated metal plate having substantially parallel planar inner and outer faces, a series of elongated teeth integral with said plate punched therefrom and extending unidirectionally substantially perpendicularly from said plate to be impressed into the wooden members, said teeth having a base portion immediately adjacent said plate, a sharpened tip remote from said plate, and an intervening elongated shank portion, said base portion having parallel front and back faces, said shank portion being concavely curved in section toward its vacated hole along the medial longitudinal axis of the tooth to provide a valley extending substantially along the entire length of the shank portion and the sides of the tooth along the shank portion being substantially parallel and being squeezed toward each other to form the lateral marginal portions of the shank portion into sharp wedge-shaped projections flanking the apex of the valley and extending forwardly of the front face of the base portion which terminate at their proximal ends in shoulders returning to the plane of said front face of the base portion and spaced from said plate to restrain withdrawal of the teeth from wooden members into which they have been impressed, said teeth being arranged in a plurality of longitudinal rows spaced uniformly transversely of said plate, the teeth of alternate rows facing in opposite directions and being offset longitudinally from the teeth of the immediate adjacent rows.

5. A connector plate for securing adjacent wooden structural members together comprising an elongated metal plate having substantially parallel planar inner and outer faces, a series of elongated teeth integral with said plate punched therefrom and extending unidirectionally substantially perpendicularly from said plate to be impressed into the wooden members, said teeth having a base portion immediately adjacent said plate, a sharpened tip remote from said plate, and an intervening elongated shank portion comprising the major portion of the length of said teeth, said base portion having parallel front and back faces and being substantially trapezoidal in front elevation with the sides thereof converging away from said plate, said shank portion being concavely curved in section toward its vacated hole along the medial longitudinal axis of the tooth to provide a valley extending substantially along the entire length of the shank portion and the sides of the tooth along the shank portion being substantially parallel and being squeezed toward each other to form the lateral marginal portions of the shank portion into sharp wedge-shaped projections flanking the apex of the valley and extending forwardly of the front face of the base portion which terminate at their proximal ends in shoulders returning to the plane of said front face of the base portion and spaced from said plate to restrain withdrawal of the teeth from wooden members into which they have been impressed, said teeth being arranged in a plurality of longitudinal rows spaced uniformly transversely of said plate, the teeth of alternate rows facing in opposite directions and being offset longitudinally from the teeth of the immediate adjacent rows.

References Cited in the file of this patent
UNITED STATES PATENTS
2,844,852    West _____ July 29, 1958